US009036099B2

(12) United States Patent
Hirakata

(10) Patent No.: US 9,036,099 B2
(45) Date of Patent: May 19, 2015

(54) LIQUID CRYSTAL DISPLAY DEVICE AND ELECTRONIC DEVICE INCLUDING THE SAME

(75) Inventor: Yoshiharu Hirakata, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 61 days.

(21) Appl. No.: 13/365,425

(22) Filed: Feb. 3, 2012

(65) Prior Publication Data

US 2012/0208637 A1    Aug. 16, 2012

(30) Foreign Application Priority Data

Feb. 14, 2011    (JP) ................................ 2011-028988

(51) Int. Cl.
| | |
|---|---|
| G02F 1/1335 | (2006.01) |
| H04N 13/04 | (2006.01) |
| G02F 1/1334 | (2006.01) |
| G02B 27/22 | (2006.01) |
| H04M 1/725 | (2006.01) |

(52) U.S. Cl.
CPC .......... *H04N 13/0452* (2013.01); *G02F 1/1334* (2013.01); *G02B 27/2214* (2013.01); *H04M 1/72544* (2013.01); *H04N 13/0411* (2013.01); *H04N 13/0413* (2013.01)

(58) Field of Classification Search
CPC .................................................. G02B 27/2214
USPC ........................................................ 349/15
See application file for complete search history.

(56) References Cited

U.S. PATENT DOCUMENTS

| 6,246,451 B1 * | 6/2001 | Matsumura et al. ............ 349/15 |
| 2002/0145682 A1 * | 10/2002 | Kwon et al. .................... 349/15 |
| 2005/0157223 A1 * | 7/2005 | Sung et al. ...................... 349/69 |
| 2006/0232719 A1 * | 10/2006 | Abileah ......................... 349/15 |
| 2007/0146233 A1 * | 6/2007 | Lee et al. .......................... 345/6 |
| 2008/0013003 A1 * | 1/2008 | Soh ................................ 349/15 |
| 2010/0123654 A1 * | 5/2010 | Kimura .......................... 345/92 |
| 2010/0128015 A1 * | 5/2010 | Feenstra et al. ............... 345/211 |
| 2011/0261303 A1 * | 10/2011 | Jang et al. ..................... 349/108 |

FOREIGN PATENT DOCUMENTS

JP    2005-258013    9/2005

* cited by examiner

*Primary Examiner* — Bumsuk Won
*Assistant Examiner* — Charles Chang
(74) *Attorney, Agent, or Firm* — Nixon Peabody LLP; Jeffrey L. Costellia

(57) ABSTRACT

Provided is a display device which can perform, with a simpler structure, switching between naked-eye 3D image display by a parallax barrier method and 2D image display without a decrease in resolution. In order to reduce manufacturing cost by reducing the number of polarizing plates, a light-shuttering portion including a polymer-dispersed liquid crystal which does not need a polarizing plate is used as a parallax barrier. Further, a light source portion serving as a backlight is formed using a light source including an EL element which forms a planar light source and does not need a diffusion plate. Furthermore, as the light source portion serving as the backlight, a plurality of EL elements are provided so that the plurality of EL elements are selectively controlled and thus selective light emission is performed.

21 Claims, 7 Drawing Sheets

LIQUID CRYSTAL DISPLAY DEVICE AND ELECTRONIC DEVICE INCLUDING THE SAME

BACKGROUND OF THE INVENTION

1. Field of the Invention

The present invention relates to a liquid crystal display device and an electronic device including the liquid crystal display device. The present invention particularly relates to a liquid crystal display device displaying three-dimensional (3D) images and an electronic device including the liquid crystal display device.

2. Description of the Related Art

Liquid crystal display devices ranging from a large display device such as a television receiver to a small display device such as a mobile phone have been spreading. From now on, products with higher added values will be needed and are being developed. In recent years, liquid crystal display devices that can display 3D images have been developed in order to display more realistic images.

As methods for displaying 3D images, there are a method using glasses for separating an image seen with a left eye and an image seen with a right eye (also referred to as image separation method), and a naked eye method by which 3D images can be seen by the naked eyes by addition of a structure for separating an image seen with a left eye and an image seen with a right eye in a display portion. It is not necessary to prepare glasses to see 3D images when the naked eye method is employed, which offers a high convenience. The 3D image display using the naked eye method has been gradually spreading to mobile phones, mobile game machines, and the like.

As a method for displaying 3D images using the naked eye method, there is known a parallax barrier method in which a parallax barrier is added to a display portion. A parallax barrier for this method is a stripe-shaped light-blocking portion and causes a decrease in resolution when display is switched from 3D image display to two-dimensional (2D) image display. In view of this drawback, for a parallax barrier method, there is suggested a structure in which a liquid crystal panel having a patterned transparent electrode is used, and when display is switched between 2D image display and 3D image display, transmission and block of light by a liquid crystal layer are switched by controlling a voltage applied to the transparent electrode. This method is able to switch between the states in which the effect as a parallax barrier appears or not (see Patent Document 1).

[Reference]
[Patent Document]
[Patent Document 1] Japanese Published Patent Application No. 2005-258013

SUMMARY OF THE INVENTION

Patent Document 1 shows a structure in which transparent electrodes are formed in a predetermined pattern, a liquid crystal layer is provided so as to be interposed between the transparent electrodes, and polarizing plates are provided outside the transparent electrodes so that a parallax barrier is achieved by the liquid crystal layer. However, the structure according to Patent Document 1 has a problem of high manufacturing cost because many members such as the polarizing plates are required. There is another problem of high power consumption of the liquid crystal display device because high luminance of a back light is needed due to light attenuation caused by the polarizing plates.

In view of the above drawbacks, an object of one embodiment of the present invention is to provide a display device which can perform, with a simpler structure, switching between naked-eye 3D image display by a parallax barrier method and 2D image display without a decrease in resolution.

According to one embodiment of the present invention, in order to reduce the manufacturing cost by reducing the number of the polarizing plates, a light-shuttering portion containing a polymer-dispersed liquid crystal which does not need a polarizing plate is used as a parallax barrier. According to another embodiment of the present invention, a light source portion serving as a backlight is formed using a light source including an EL (electroluminescent) element which forms a planar light source and does not need a diffusion plate. According to another embodiment of the present invention, as the light source portion serving as the backlight, a plurality of EL elements are provided so that the plurality of EL elements are selectively controlled and thus selective light emission is performed.

One embodiment of the present invention is a liquid crystal display device including a light source portion which emits light from a planar light source including an EL element; a light-shuttering portion which is provided so as to overlap with the light source portion, and comprises a plurality of electrodes and a polymer dispersed liquid crystal interposed therebetween; and a liquid crystal panel which is provided so as to overlap with the light source portion and the light-shuttering portion, and includes a first pixel portion displaying a left-eye image and a second pixel portion displaying a right-eye image. The transmittance of light from the light source portion is controlled by forming a light-transmitting portion and a light-blocking portion in the polymer dispersed liquid crystal through the control of a voltage applied between the plurality of electrodes.

Another embodiment of the present invention is a liquid crystal display device including a light source portion which performs selective light emission from a light source including a plurality of EL elements; a light-shuttering portion which is provided so as to overlap with the light source portion, and comprises a plurality of electrodes and a polymer dispersed liquid crystal interposed therebetween; and a liquid crystal panel which is provided so as to overlap with the light source portion and the light-shuttering portion, and includes a first pixel portion displaying a left-eye image and a second pixel portion displaying a right-eye image. The transmittance of light from the light source portion is controlled by forming a light-transmitting portion and a light-blocking portion in the polymer dispersed liquid crystal through the control of a voltage applied between the plurality of electrodes.

In one embodiment of the present invention, the selective light emission of the plurality of EL elements is preferably controlled by active matrix driving or passive matrix driving.

In one embodiment of the present invention, the first pixel portion and the second pixel portion preferably includes a color filter, a liquid crystal element, and a switching element which drives the liquid crystal element.

According to one embodiment of the present invention, the manufacturing cost can be reduced since the number of polarizing plates can be reduced. According to another embodiment of the present invention, the manufacturing cost can be reduced since the number of diffusion plates in a light source portion can be reduced. Additionally, it is possible to achieve a liquid crystal display device which can perform, with a simpler structure, switching between naked-eye 3D image display by a parallax barrier method and 2D image display without a decrease in resolution.

According to one embodiment of the present invention, selective light emission can be performed in a light source portion, and a region which does not emit light can be formed. Therefore, a liquid crystal display device with higher contrast ratio and lower power consumption can be achieved.

DETAILED DESCRIPTION OF THE INVENTION

Figure 1A:
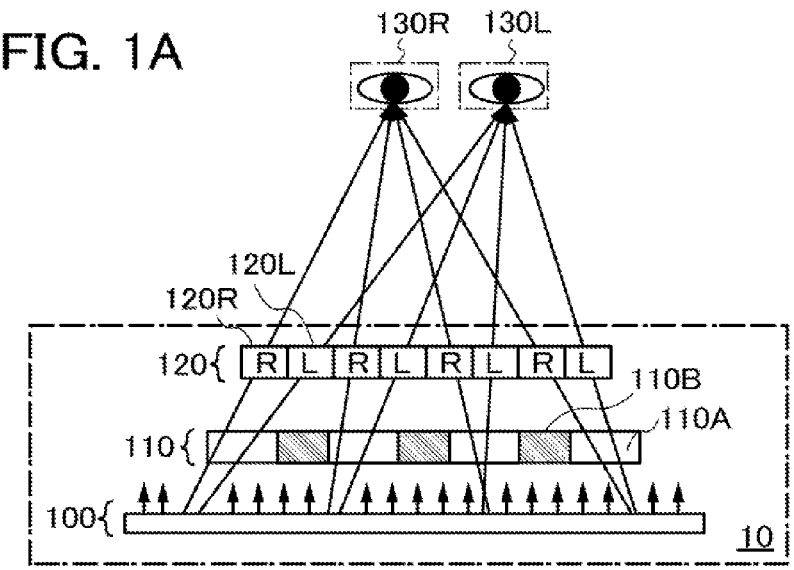
FIGS. 1A and 1B illustrate a structure of a liquid crystal display device.

Hereinafter, embodiments of the present invention will be described with reference to the accompanying drawings. However, the present invention can be carried out in many different modes, and it is easily understood by those skilled in the art that modes and details of the present invention can be modified in various ways without departing from the purpose and the scope of the present invention. Therefore, this invention is not interpreted as being limited to the description of the embodiments below. Note that identical portions or portions having the same function in all drawings illustrating the structure of the invention that are described below are denoted by the same reference numerals.

Note that the size, the thickness, and the area of each structure illustrated in the drawings in the embodiments are exaggerated for simplicity in some cases. Therefore, embodiments of the present invention are not limited to such scales.

Note that, in this specification, the terms "first", "second", "third", to "N (N is a natural number)" are used only for preventing confusion between components, and thus do not limit numbers.

(Embodiment 1)

Figure 1B:
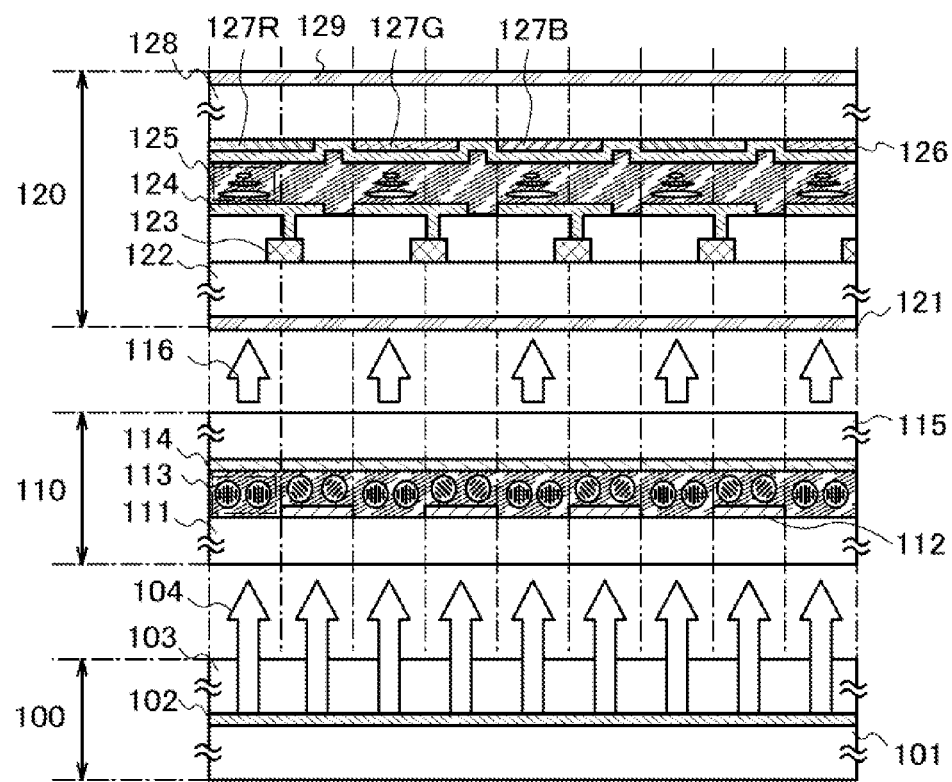

This embodiment shows the structure of a liquid crystal display device according to one embodiment of the present invention with reference to FIGS. 1A and 1B.

FIG. 1A illustrates a structural example of a liquid crystal display device. A liquid crystal display device 10 illustrated in FIG. 1A includes a light source portion 100, a light-shuttering portion 110, and a liquid crystal panel 120. FIG. 1A also illustrates a left eye 130L and a right eye 130R of a viewer who views the liquid crystal display device 10. FIG. 1A visualizes how light from the liquid crystal display device 10 is viewed by the viewer, by using arrows pointing toward the left eye 130L and the right eye 130R of the viewer.

The light source portion 100 includes a planar light source which can be obtained by forming EL elements over the entire surface. Further, the light source portion 100 is provided so as to overlap with the light-shuttering portion 110 and the liquid crystal panel 120. The light source portion 100 emits light represented by arrows in FIG. 1A to the light-shuttering portion 110 side.

The light-shuttering portion 110 includes a polymer-dispersed liquid crystal interposed between electrodes. In the polymer-dispersed liquid crystal, a light-transmitting portion 110A and a light-blocking portion 110B are formed by controlling a voltage applied between the electrodes. Therefore, the light-shuttering portion 110 selectively transmits light from the light source portion 100, by using the light-transmitting portion 110A and the light-blocking portion 110B. The light-shuttering portion 110 is provided so as to overlap with the light source portion 100 and the liquid crystal panel 120 and to be interposed between the light source portion 100 and the liquid crystal panel 120. FIG. 1A visualizes how the light from the light source portion 100, which is represented by the arrows, passes through the light-transmitting portion 110A and is blocked by the light-blocking portion 110B in the light-shuttering portion 110.

The liquid crystal panel 120 includes a first pixel portion 120L for displaying left-eye images and a second pixel portion 120R for displaying right-eye images. In the liquid crystal panel 120, light from the light source portion 100, which has passed through the light-transmitting portion 110A in the light-shuttering portion 110, is transmitted in accordance with image signals in the first pixel portion 120L and the second pixel portion 120R. Light controlled for left-eye images in the first pixel portion 120L enters the left eye 130L of the viewer to be viewed. Light controlled for right-eye images in the second pixel portion 120R enters the right eye 130R of the viewer to be viewed. The liquid crystal panel 120 is provided so as to overlap with the light source portion 100 and the light-shuttering portion 110 and to be closer to the viewer than the light source portion 100 and the light-shuttering portion 110.

FIG. 1B is a cross-sectional view more specifically illustrating components in the liquid crystal display device 10 illustrated in FIG. 1A. As in FIG. 1A, FIG. 1B illustrates the light source portion 100, the light-shuttering portion 110, and the liquid crystal panel 120.

The light source portion 100 includes the first substrate 101, the EL element 102, and the second substrate 103. The EL element 102 is formed over the entire surface, thereby serving as a planar light source. The EL element 102 emits light toward the light-shuttering portion 110 (the light is represented by arrows 104 in FIG. 1B).

The first substrate 101 may be any substrate over which the EL element 102 can be formed. An example of the first substrate 101 is a glass substrate. Note that the first substrate 101 is not necessarily light transmissive, and may be a metal substrate, for example. When a metal substrate is used, for example, a function as a heat sink can be added thereto because the thermal conductivity is high.

The EL element 102 includes an anode (also referred to as first electrode), a cathode (also referred to as second electrode), and an EL layer interposed between the anode and the cathode. The EL layer may be configured to include, in addition to a light-emitting layer, a hole-injection layer, a hole-transport layer, an electron-transport layer, and an electron-injection layer. The EL element 102 may be configured to provide white light by stacking, between the anode and the cathode, EL layers emitting complementary colors. Light emission of the EL layer in the EL element 102 may be either fluorescence or phosphorescence, or both.

The second substrate 103 is a light-transmitting substrate. Examples of the second substrate 103 are a glass substrate and a quartz substrate. Instead of using the second substrate 103, a light transmissive insulating film having a gas-barrier property may be used.

The light-shuttering portion 110 includes a first substrate 111, a first electrode 112, a polymer-dispersed liquid crystal 113, a second electrode 114, and a second substrate 115. In the light-shuttering portion 110, voltage applied between the first electrode 112 and the second electrode 114 controls orientation of the polymer-dispersed liquid crystal 113. In the light-shuttering portion 110, scattering of light emitted to the light-shuttering portion 110 is selectively controlled. Further, the light-shuttering portion 110 controls transmission or block of light in accordance with the scattering. Light passing through the light-shuttering portion 110 is selectively emitted toward the liquid crystal panel 120 (the light is represented by arrows 116 in FIG. 1B). Therefore, the light-shuttering portion 110 can switch the presence or absence of the effect as a parallax barrier by orientation of the polymer-dispersed liquid crystal 113, so that it is possible to achieve a liquid crystal display device which can perform switching between naked-eye 3D image display by a parallax barrier and 2D image display without decrease in resolution caused by a parallax barrier.

The first substrate 111 is light transmissive and can be provided with a first electrode 112. Examples of the first substrate 111 are a glass substrate and a quartz substrate.

The first electrode 112 is formed using a light-transmitting and conductive material. An example of the material of the first electrode 112 is an indium oxide-tin oxide ($In_2O_3$—$SnO_2$, abbreviated to ITO).

The polymer-dispersed liquid crystal (PDLC) 113 is of a liquid crystal system in which a layer where liquid crystals are dispersed in a polymer is used as a liquid crystal layer. The liquid crystal is a micrograin with a diameter of approximately greater than or equal to 0.1 µm and less than or equal to 20 µm (typically approximately 1 µm). Note that a polymer-dispersed liquid crystal (PDLC) mode is employed as a driving method. Alternatively, a polymer network liquid crystal (PNLC) may be used. The polymer network liquid crystal is of a liquid crystal system in which a layer where liquid crystals are continuously arranged in a polymer network is used as a liquid crystal layer. Note that the polymer-dispersed liquid crystal in this specification and the scope of the claims includes the above-described polymer-dispersed liquid crystal and the polymer network liquid crystal.

The second electrode 114 is formed using a light transmissive and conductive material. An example of the material of the first electrode 112 is ITO.

The second substrate 115 is light transmissive and can be provided with the second electrode 114. Examples of the second substrate 115 are a glass substrate and a quartz substrate.

The liquid crystal panel 120 includes a first polarizing plate 121, a first substrate 122, a switching element 123, a first electrode 124, a liquid crystal 125, a second electrode 126, a red color filter 127R, a green color filter 127G, a blue color filter 127B, a second substrate 128, and a second polarizing plate 129.

The first polarizing plate 121 polarizes light which has passed through the light-shuttering portion 110 to be selectively emitted toward the liquid crystal panel 120.

The first substrate 122 is light transmissive and can be provided with the switching element 123. Examples of the first substrate 122 are a glass substrate and a quartz substrate.

As the switching element 123, a transistor, especially a thin film transistor can be used. Examples of a semiconductor material used for a semiconductor film where a channel of the thin film transistor is formed are amorphous silicon, polycrystalline silicon, single crystal silicon, microcrystalline silicon, and the like. Another example is an oxide semiconductor.

The first electrode 124 is formed using a light transmissive and conductive material. An example of the material of the first electrode 124 is ITO.

The liquid crystal 125 is used in combination with the first polarizing plate 121 and the second polarizing plate 129 so as to control the degree of light transmission. The orientation of the liquid crystal 125 is controlled by an electric field generated by voltage applied between the first electrode 124 and the second electrode 126 (including an electric field in a horizontal direction, an electric field in a vertical direction, and an electric field in an oblique direction), so that the degree of light transmission is controlled.

The second electrode 126 is formed using a light transmissive and conductive material. An example of the material of the second electrode 126 is ITO.

The red color filter 127R, the green color filter 127G, and the blue color filter 127B are selectively formed by providing materials which can transmit light having a wavelength region corresponding to predetermined colors. The red color filter 127R, the green color filter 127G, and the blue color filter 127B, are formed using, for example, an organic resin such as an acrylic-based resin in which pigment is dispersed. The red color filter 127R, the green color filter 127G, and the blue color filter 127B can be selectively formed by using a droplet discharge method such as an inkjet method.

The second substrate 128 is light transmissive and can be provided with the second electrode 126, the red color filter 127R, the green color filter 127G, and the blue color filter 127B. Examples of the second substrate 128 are a glass substrate and a quartz substrate.

The second polarizing plate 129 polarizes light which has passed through the first polarizing plate 121 and the liquid crystal 125 and been emitted toward the viewer side. Note that the second polarizing plate 129 is preferably disposed so as to be in a crossed Nicols state with respect to a transmitting axis of the first polarizing plate 121.

The above-described structure of this embodiment can achieve lower manufacturing cost by reducing the number of polarizing plates than a structure where the light-shuttering portion 110 includes a liquid crystal which needs polarizing plates. In addition, the structure of this embodiment can achieve higher luminance of a display surface by reducing the number of polarizing plates than the structure where the light-shuttering portion 110 includes a liquid crystal which needs polarizing plates. Further, the above-described structure of this embodiment eliminates the need for a diffusion plate by forming a planar light source using an EL element and serving as a backlight, and thus achieves lower manufacturing cost than a structure in which light of a light-emitting diode is used as a uniform planar light source by using a diffusion plate. Therefore, according to this embodiment, it is possible to achieve a liquid crystal display device which can perform, with a simpler structure, switching between naked-eye 3D image display by a parallax barrier method and 2D image display without a decrease in resolution.

Embodiment 1 can be implemented in appropriate combination with any of the structures described in the other embodiments.

(Embodiment 2)

This embodiment shows structural examples and modulation examples of the light source portion 100 and the light-shuttering portion 110 included in the liquid crystal display device 10 described in Embodiment 1.

[Structural Examples of the Light Source Portion 100]

Figure 2A:
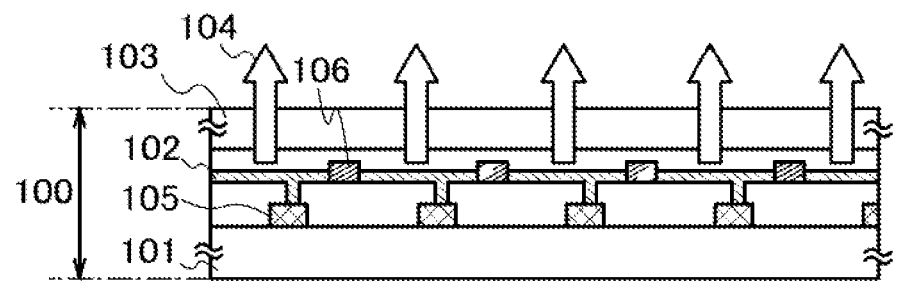
FIGS. 2A to 2C illustrate structures of a light source portion.

FIG. 2A illustrates a modulation example of the light source portion 100 illustrated in FIG. 1A. The light source portion 100 illustrated in FIG. 2A includes the first substrate 101, the EL element 102, and the second substrate 103, which are described in Embodiment 1, and also includes a switching element 105 and a partition 106 for isolating the EL element 102 into a plurality of EL elements.

As the switching element 105, a transistor, especially a thin film transistor can be used. Examples of a semiconductor material used for a semiconductor film where a channel of the thin film transistor is formed are amorphous silicon, polycrystalline silicon, single crystal silicon, microcrystalline silicon, and the like. Another example is an oxide semiconductor.

The partition 106 is a structure body formed using an insulator for isolating the plurality of EL elements 102 in order not to cause an electric short circuit between the adjacent EL elements 102. The partition 106 can be formed using, for example, an organic resin such as a polyimide, an acrylic resin, a polyimide, or an epoxy resin, or an inorganic insulating material.

With the structure illustrated in FIG. 2A, it is possible to achieve active matrix operation such that the plurality of EL elements are selectively controlled by the switching elements. Accordingly, with the structure of this embodiment, the light source portion 100 serving as a backlight can selectively control the plurality of EL elements arranged in a matrix; thus, selective light emission can be performed.

Figure 2B:
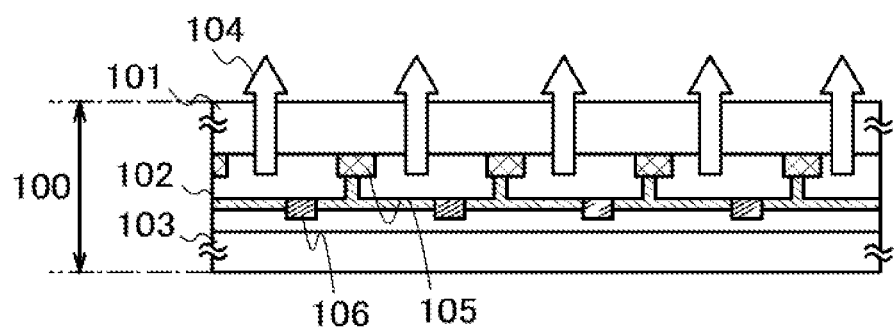

FIG. 2B illustrates another example of a structure in which the plurality of EL elements illustrated in FIG. 2A are selectively controlled. FIG. 2A illustrates the structure in which light is emitted from the second substrate 103 side as indicated by the arrows 104, whereas FIG. 2B illustrates a structure in which light is emitted from the first substrate 101 side as indicated by the arrows 104.

Figure 2C:
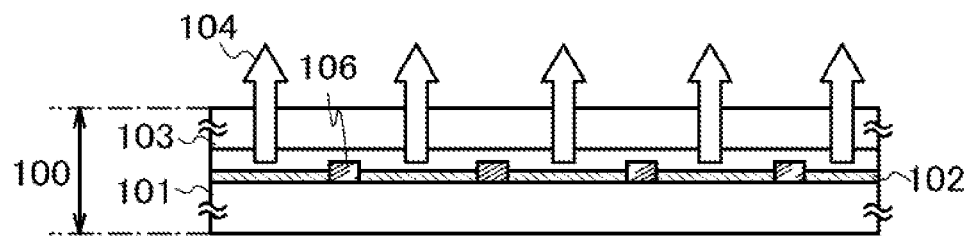

Note that as illustrated in FIG. 2C, it is also possible to perform so-called passive matrix operation to achieve the selective light emission without the formation of the switching element in the light source portion 100.

Next, a structure of the active matrix light source portion 100 illustrated in FIGS. 2A and 2B is described with reference to a block diagram and a circuit diagram of FIGS. 3A and 3B.

Figure 3A:
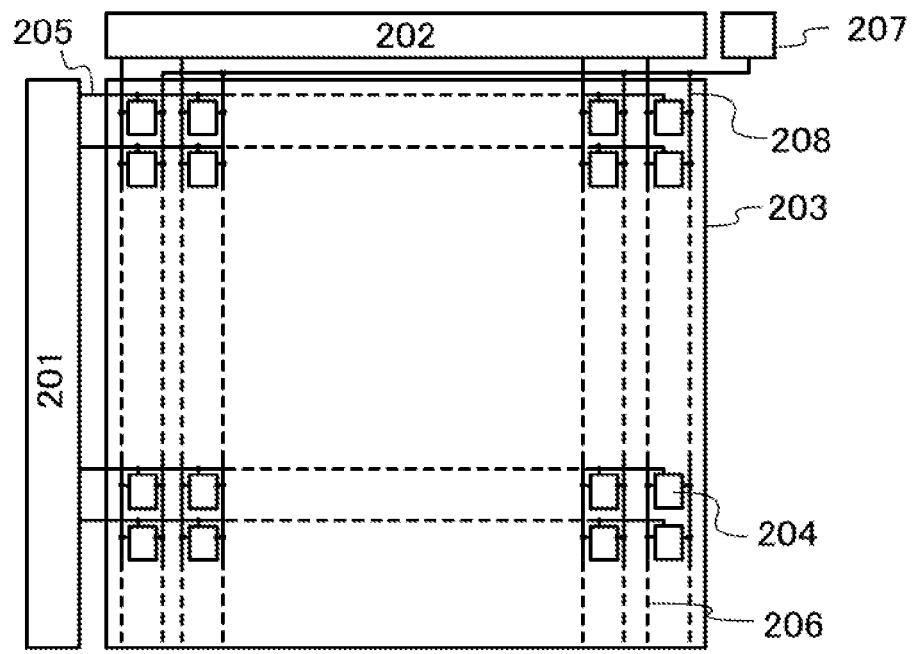
FIGS. 3A and 3B are a block diagram and a circuit diagram of a light source portion.

The block diagram of the active matrix light source portion 100 illustrated in FIG. 3A can be represented by a scan line driver circuit 201, a signal line driver circuit 202, and a light source region 203. The light source region 203 includes a plurality of light sources 204 in a matrix, each of which has the EL element. The plurality of light sources 204 are connected to a scan line 205 controlled by the scan line driver circuit 201, a signal line 206 controlled by the signal line driver circuit 202, and a current supply line 208 connected to a power supply circuit 207.

Figure 3B:
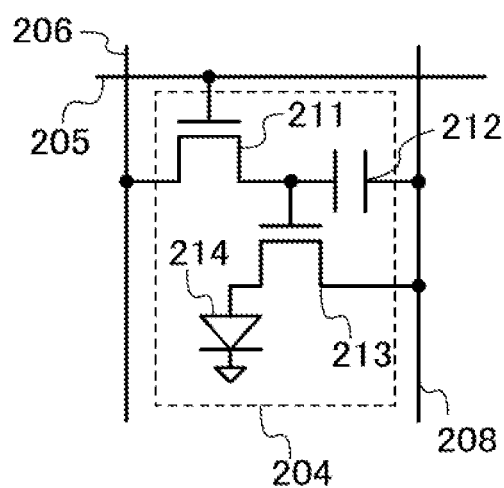

FIG. 3B illustrates an example of a circuit diagram of the light source 204 included in the light source region 203 illustrated in FIG. 3A. The light source 204 illustrated in FIG. 3B includes a transistor 211, a capacitor 212, a transistor 213, and an EL element 214. A gate of the transistor 211 is connected to the scan line 205. One of a source and a drain of the transistor 211 is connected to the signal line 206. One electrode of the capacitor 212 is connected to the other of the source and the drain of the transistor 211. The other electrode of the capacitor 212 is connected to the current supply line 208. A gate of the transistor 213 is connected to the other of the source and the drain of the transistor 211 and the one electrode of the capacitor 212. One of a source and a drain of the transistor 213 is connected to the current supply line 208. One electrode of the EL element 214 is connected to the other of the source and the drain of the transistor 213. The other electrode of the EL element 214 is connected to a common electrode. With the structure in FIGS. 3A and 3B, the light source 204 can selectively emit light by using the scan line 205 and the signal line 206. Further, with the structure in FIGS. 3A and 3B, the grayscale can be individually controlled by adjusting the amount of current flowing in each light source 204.

The following shows a structural example of a cross-sectional view of the EL element. This embodiment shows a case where a thin film transistor containing polycrystalline silicon is used as a switching element.

Figure 4A:
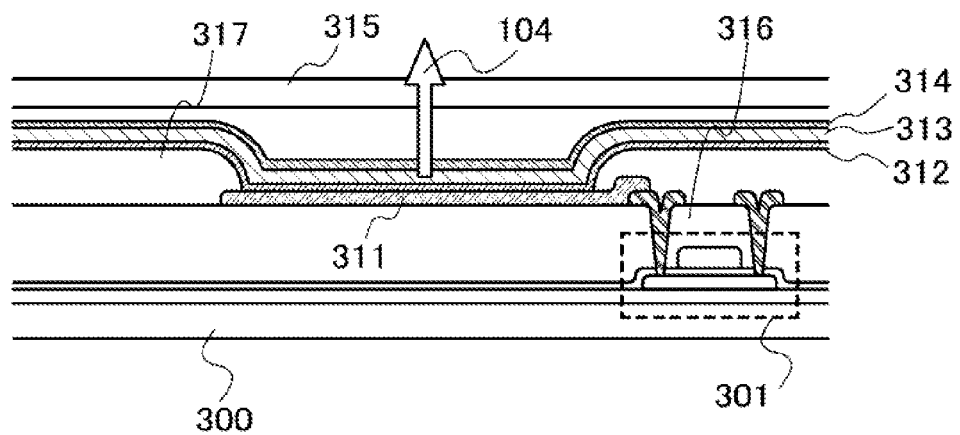
FIGS. 4A and 4B are cross-sectional views of a light source portion.
Figure 4B:
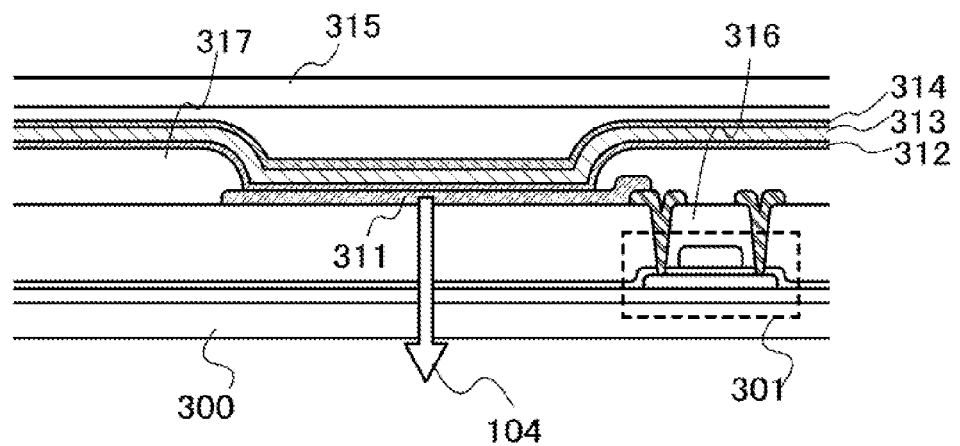

As illustrated in FIGS. 4A and 4B, a thin film transistor can be used as the transistor 301 which is a switching element provided over a first substrate 300. Examples of a semiconductor material used for a semiconductor film where a channel of the thin film transistor is formed are amorphous silicon, polycrystalline silicon, single crystal silicon, microcrystalline silicon, and the like. Another example is an oxide semiconductor.

Note that FIG. 4A illustrates a structure which emits light toward the second substrate side as in FIG. 2A, whereas FIG. 4B illustrates a structure which emits light toward the first substrate side as in FIG. 2B.

A gate electrode (scan line) is formed over the semiconductor film with a gate insulating film interposed therebetween, and the semiconductor film below the gate electrode serves as a channel formation region. The semiconductor film includes regions serving as a source region and a drain region. A first insulating film 316 is formed so as to cover the gate electrode, and includes openings (contact holes) over the regions serving as the source region and the drain region. Electrodes (wirings) are provided in the openings, and the electrodes serve as a source electrode and a drain electrode. The first insulating film 316 can be formed using an organic material or an inorganic material.

A first electrode 311 of the EL element is formed so as to be connected to the drain electrode. A partition 317 is provided so as to cover part of the first electrode 311. An EL layer 312 is provided over the first electrode 311, and a second electrode 313 is provided over the EL layer 312. A second insulating film 314 serving as a passivation film is formed over the second electrode 313. The second insulating film 314 can prevent the entrance of moisture and oxygen which cause degradation.

A space which is to be formed by attaching the first substrate 300 and the second substrate 315 to each other is filled with nitrogen and with or without a desiccant.

In the above-described structure in the cross-sectional view of the EL element, in order to achieve a structure emitting light toward the second substrate 315 side as illustrated in FIG. 4A, the first electrode 311 is formed using a highly light-reflective material and the second electrode 313 is formed using a highly light-transmissive material.

Alternatively, in the above-described structure of the cross-sectional view in the EL element, in order to achieve a structure emitting light toward the first substrate 300 side as illustrated in FIG. 4B, the first electrode 311 is formed using a highly light-transmissive material and the second electrode 313 is formed using a highly light-reflective material.

[A Structural Example of the Light-Shuttering Portion 110]

Figure 5A:
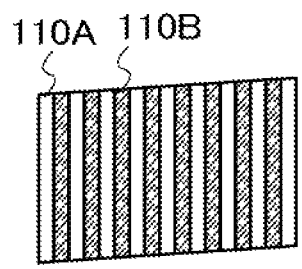
FIGS. 5A and 5B illustrate structures of a light-shuttering portion.
Figure 5B:
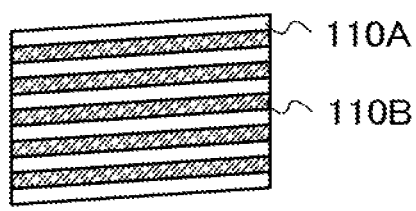

The first electrode 112 and the second electrode 114 in the light-shuttering portion 110 illustrated in FIGS. 1A and 1B are formed in advance so that the stripe-shaped light-transmitting portion 110A and light-blocking portion 110B can be formed and a viewer can recognize the parallax. That is, a polymer-dispersed liquid crystal in the light-shuttering portion 110 can be selectively formed in either vertical stripes of the light-transmitting portion 110A and the light-blocking portion 110B (see FIG. 5A) or horizontal stripes of the light-transmitting portion 110A and the light-blocking portion 110B (see FIG. 5B) depending on how the first electrode 112 and the second electrode 114 are formed. Note that switching can be performed in such a manner that no voltage application between the first electrode 112 and the second electrode 114 in the light-shuttering portion 110 eliminates the light-blocking portion and allows the entire surface of the light-shuttering portion 110 to transmit light. The switching is effective in displaying images without a decrease in resolution when 2D image display is performed.

[Advantages of the Light Source Portion 100 Including a Plurality of EL Elements]

Figure 6A:
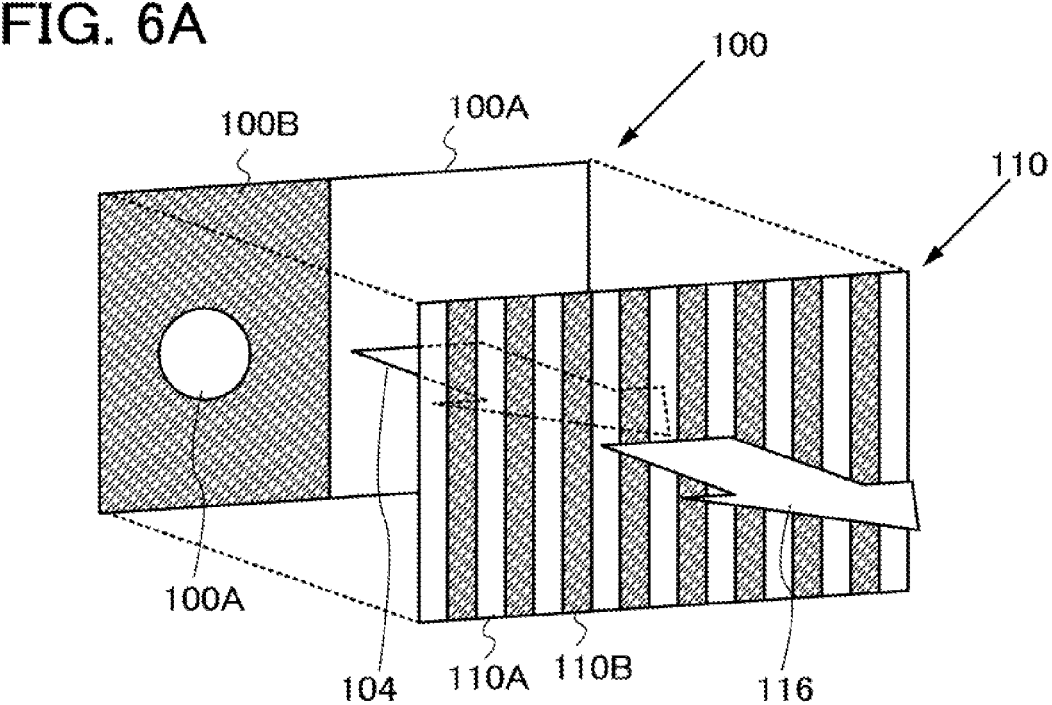
FIGS. 6A and 6B illustrate examples of light emission in a light source portion.
Figure 6B:
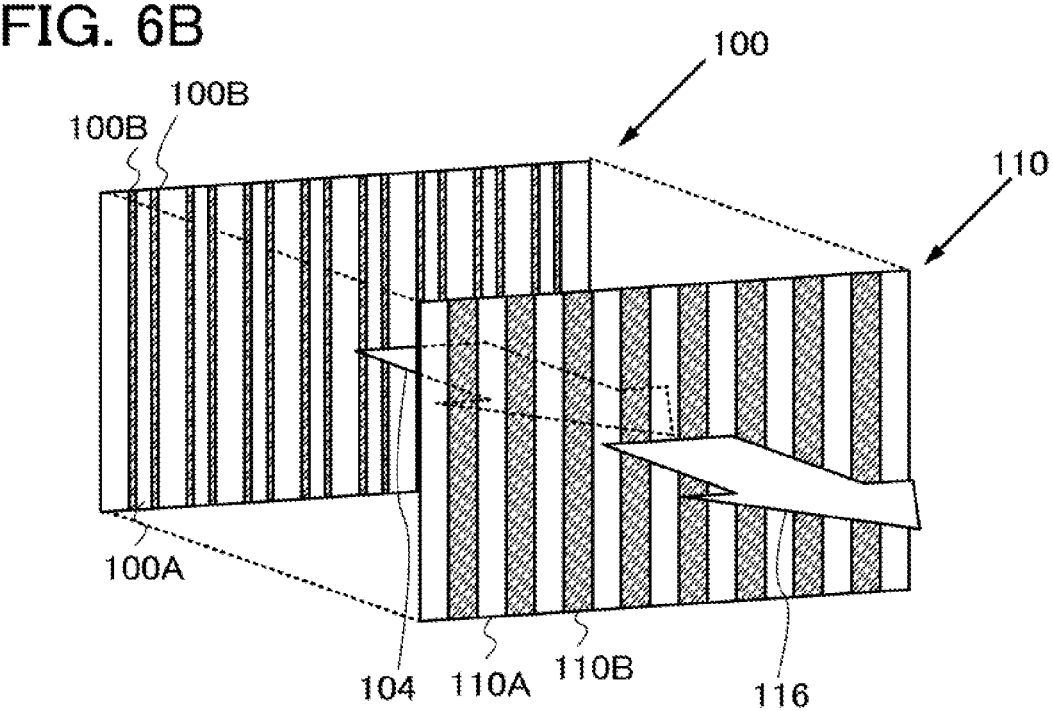

The following shows advantages of combining the above-described light source portion 100, which includes the plurality of EL elements, and the light-shuttering portion 110 in which the stripe-shaped light-blocking portion can be formed, with reference to FIGS. 6A and 6B.

In a liquid crystal display device, by individually controlling the plurality of EL elements in the light source portion 100, light emission of the light source portion 100 can be locally controlled. Accordingly, the contrast ratio of an image displayed by the liquid crystal display device can be improved.

FIG. 6A illustrates a specific example of the local control of the light source portion 100 serving as a backlight. When light emission of the light source portion 100 can be locally controlled, as illustrated in the light source portion 100 in FIG. 6A, a non-lighted light source portion 100A and a lighted light source portion 100B can be formed. Accordingly, a structure can be provided in which the light emission of the plurality of EL elements in the region corresponding to an image displayed by the liquid crystal display device can be locally controlled depending on luminance of the image. Note that, it is possible to obtain the same effects even when switching between 2D image display and 3D image display is performed.

With the structure of this embodiment, selective light emission of the plurality of EL elements in the light source portion 100 can be subdivided into a size similar to the width of the first electrode 112 of the light-shuttering portion 110. Accordingly, for example, the selective light emission of the plurality of EL elements can be performed in accordance with the stripe-shaped light-transmitting portion 110A and light-blocking portion 110B in the light-shuttering portion 110. More specifically, it is possible to allow the EL elements, which overlap with the first electrode 112 of the light-shuttering portion 110, to selectively exist in the lighted state or the non-lighted state.

Explanation is given for a structural example of the individual light emission of the plurality of EL elements in the light source portion 100 with reference to FIG. 6B. In FIG. 6B, the light-shuttering portion 110 includes the stripe-shaped light-transmitting portion 110A and light-blocking portion 110B. In some cases, the light-shuttering portion 110 includes a region where voltage application to the polymer-dispersed liquid crystal is not sufficient. In such a case, light leakage is likely to occur in the light-blocking portion 110B. Furthermore, light leakage from the EL elements which overlap with the light-blocking portion 110B might be detected depending on the position of the viewer. Therefore, in order to prevent the light leakage, the non-lighted light source portion 100A and the lighted light source portion 100B are locally formed in a region of the light source portion 100, which overlaps with the light-blocking portion 110B. For instance, as illustrated in FIG. 6B, in the region which overlaps with the light-blocking portion 110B of the light-shuttering portion 110, the EL elements close to the boundary with the region overlapping with the light-transmitting portion 110A is allowed to selectively exist in the lighted state as the lighted light source portion 100B.

One embodiment of the present invention described in this embodiment can, as in the structure of Embodiment 1, achieve lower manufacturing cost by reducing the number of polarizing plates than a structure where the light-shuttering portion 110 includes a liquid crystal which needs polarizing plates. In addition, one embodiment of the present invention described in this embodiment can, as in the structure of Embodiment 1, achieve higher luminance of a display surface by reducing the number of polarizing plates than the structure where the light-shuttering portion 110 includes a liquid crystal which needs polarizing plates. Therefore, according to this embodiment, it is possible to achieve a liquid crystal display device which can perform, with a simpler structure, switching between naked-eye 3D image display by a parallax barrier method and 2D image display without a decrease in resolution.

In particular, according to one embodiment of the present invention described in this embodiment, selective light emission can be performed by providing a plurality of EL elements in a light source portion serving as a backlight and allowing the EL elements to be selectively controlled.

Embodiment 2 can be implemented in appropriate combination with any of the structures described in the other embodiments.

(Embodiment 3)

A liquid crystal display device disclosed in this specification can be applied to a variety of electronic devices (including game machines). Examples of electronic devices are a television set (also referred to as television or television receiver), a monitor for a computer or the like, a camera such as a digital camera or a digital video camera, a digital photo frame, a mobile phone handset (also referred to as mobile phone or mobile phone device), a portable game machine, a portable information terminal, an audio reproducing device, a large game machine such as a pachinko machine, and the like. Examples of electronic devices each including the display device described in any of the above embodiments are described below.

Figure 7A:
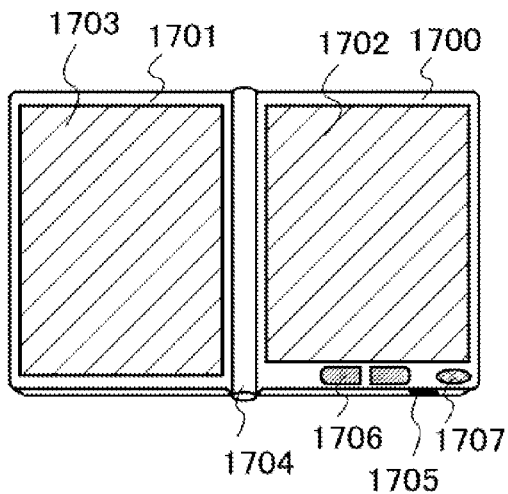
FIGS. 7A to 7D illustrate electronic devices.

FIG. 7A illustrates an example of an electronic book reader. The electronic book reader illustrated in FIG. 7A includes two housings, a housing 1700 and a housing 1701. The housing 1700 and the housing 1701 are combined with a hinge 1704 so that the electronic book reader can be opened and closed. With such a structure, the electronic book reader can be operated like a paper book.

A display portion 1702 and a display portion 1703 are incorporated in the housing 1700 and the housing 1701, respectively. The display portion 1702 and the display portion 1703 may be configured to display one image or different images. In the case where the display portion 1702 and the display portion 1703 display different images, for example, a display portion on the right side (the display portion 1702 in FIG. 7A) can display text and a display portion on the left side (the display portion 1703 in FIG. 7A) can display graphics.

FIG. 7A illustrates an example in which the housing 1700 is provided with an operation portion and the like. For example, the housing 1700 is provided with a power supply input terminal 1705, an operation key 1706, a speaker 1707, and the like. With the operation key 1706, pages can be turned. Note that a keyboard, a pointing device, or the like may be provided on the surface of the housing, on which the display portion is provided. Further, an external connection terminal (an earphone terminal, a USB terminal, a terminal that can be connected to various cables such as a USB cable, or the like), a recording medium insertion portion, or the like may be provided on the back surface or the side surface of the housing. Further, the electronic book reader illustrated in FIG. 7A may have a function of an electronic dictionary.

Figure 7B:
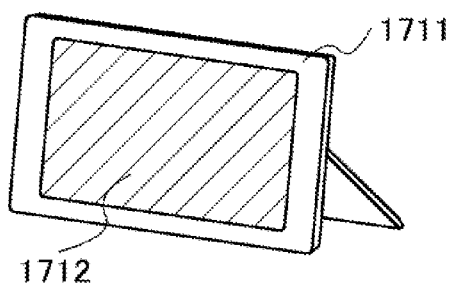

FIG. 7B illustrates an example of a digital photo frame including a display device. For example, in the digital photo frame illustrated in FIG. 7B, a display portion 1712 is incorporated in a housing 1711. The display portion 1712 can display various images. For example, the display portion 1712 can display data of an image taken with a digital camera or the like and function as a general photo frame.

Note that the digital photo frame illustrated in FIG. 7B is provided with an operation portion, an external connection terminal (a USB terminal, a terminal that can be connected to various cables such as a USB cable, or the like), a recording medium insertion portion, and the like. Although these components may be provided on the surface on which the display portion is provided, it is preferable to provide them on the side surface or the back surface for the design of the digital photo frame. For example, a memory storing data of an image taken with a digital camera is inserted in the recording medium insertion portion of the digital photo frame, whereby the image data can be transferred and then displayed on the display portion 1712.

Figure 7C:
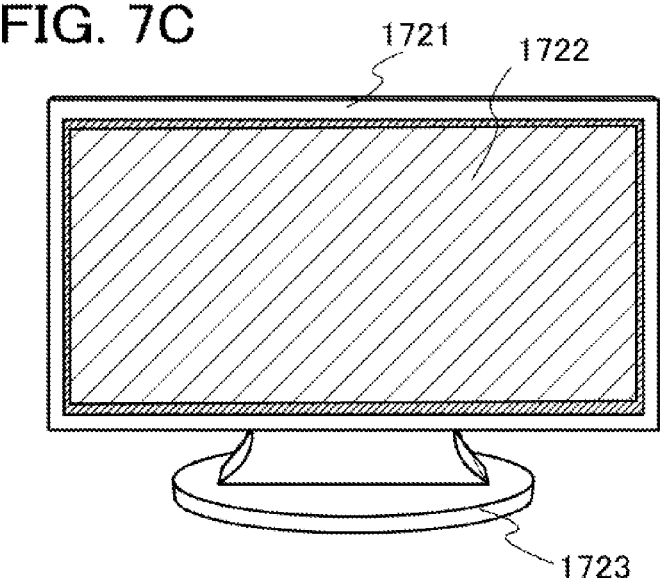

FIG. 7C shows an example of a television set including a display device. In the television set illustrated in FIG. 7C, a display portion 1722 is incorporated in a housing 1721. The display portion 1722 can display an image. Further, the housing 1721 is supported by a stand 1723 here. The display device described in any of the above embodiments can be used in the display portion 1722.

The television set in FIG. 7C can be operated with an operation switch of the housing 1721 or a separate remote controller. Channels and volume can be controlled with an operation key of the remote controller so that an image displayed on the display portion 1722 can be controlled. Further, the remote controller may be provided with a display portion that displays data output from the remote controller.

Figure 7D:
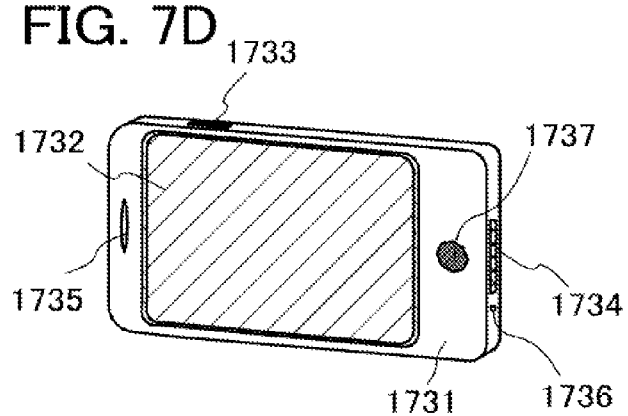

FIG. 7D shows an example of a mobile phone handset using a display device. The mobile phone handset illustrated in FIG. 7D is provided with a display portion 1732 incorporated in a housing 1731, an operation button 1733, an operation button 1737, an external connection port 1734, a speaker 1735, a microphone 1736, and the like.

The display portion 1732 of the mobile phone handset illustrated in FIG. 7D is a touch panel. By touching the display portion 1732 with a finger or the like, contents displayed on the display portion 1732 can be controlled. Further, operations such as making calls and texting can be performed by touching the display portion 1732 with a finger or the like.

Embodiment 3 can be implemented in appropriate combination with any of the structures described in the other embodiments.

This application is based on Japanese Patent Application serial no. 2011-028988 filed with Japan Patent Office on Feb. 14, 2011, the entire contents of which are hereby incorporated by reference.

What is claimed is:

1. A liquid crystal display device comprising:
a light source portion;
a light-shuttering portion over the light source portion; and
a liquid crystal panel over the light-shuttering portion, the liquid crystal panel comprising a first pixel portion for displaying a left-eye image and a second pixel portion for displaying a right-eye image,
wherein the light-shuttering portion comprises a polymer dispersed liquid crystal interposed between a pair of electrodes,
wherein one of the pair of electrodes is stripe-shaped,
wherein the pair of electrodes is arranged so that a stripe-shaped light-transmitting portion and a stripe-shaped light-blocking portion are formed by controlling a voltage applied to the pair of electrodes,
wherein the polymer dispersed liquid crystal is included in both the stripe-shaped light-transmitting portion and the stripe-shaped light-blocking portion, and
wherein the light source portion is configured to selectively exist in a lighted state or a non-lighted state in a region overlapping with the one of the pair of electrodes.

2. The liquid crystal display device according to claim 1, wherein each of the first pixel portion and the second pixel portion comprises a color filter, a liquid crystal element, and a switching element for driving the liquid crystal element.

3. The liquid crystal display device according to claim 2, wherein the switching element comprises an oxide semiconductor.

4. An electronic device comprising the liquid crystal display device according to claim 1.

5. An electronic device comprising a first housing and a second housing combined with each other, wherein at least one of the first housing and the second housing comprises the liquid crystal display device according to claim 1.

6. The electronic device according to claim 5, wherein the first housing and the second housing are combined with a hinge so that the electronic device is able to be opened and closed.

7. The electronic device according to claim 5, wherein the electronic device is selected from a game machine and an electronic book reader.

8. The liquid crystal display device according to claim 1, further comprising a pair of polarization plates which sandwiches the liquid crystal panel.

9. The liquid crystal display device according to claim 1, wherein the liquid crystal panel comprises a color filter, wherein a part of the stripe-shaped light-blocking portion does not overlap with the color filter.

10. The liquid crystal display device according to claim 1, wherein the pair of electrodes is located over a substrate, and
wherein the polymer dispersed liquid crystal is in direct contact with the substrate in the stripe-shaped light-transmitting portion.

11. A liquid crystal display device comprising:
a light source portion comprising a plurality of electroluminescent elements;
a light-shuttering portion over the light source portion; and
a liquid crystal panel over the light-shuttering portion, the liquid crystal panel comprising a first pixel portion for displaying a left-eye image and a second pixel portion for displaying a right-eye image,
wherein the light-shuttering portion comprises a polymer dispersed liquid crystal interposed between a pair of electrodes,
wherein one of the pair of electrodes is stripe-shaped,
wherein the pair of electrodes is arranged so that a stripe-shaped light-transmitting portion and a stripe-shaped light-blocking portion are formed by controlling a voltage applied to the pair of electrodes,
wherein the polymer dispersed liquid crystal is included in both the stripe-shaped light-transmitting portion and the stripe-shaped light-blocking portion, and wherein the light source portion is configured to selectively exist in a lighted state or a non-lighted state in a region overlapping with the one of the pair of electrodes.

12. The liquid crystal display device according to claim 11, wherein each of the first pixel portion and the second pixel portion comprises a color filter, a liquid crystal element, and a switching element for driving the liquid crystal element.

13. The liquid crystal display device according to claim 12, wherein the switching element comprises an oxide semiconductor.

14. The liquid crystal display device according to claim 11, wherein the plurality of electroluminescent elements are arranged in matrix, and
wherein each of the plurality of electroluminescent elements is individually driven by a transistor.

15. The liquid crystal display device according to claim 11, wherein each of the plurality of electroluminescent elements emits white light.

16. A game machine comprising the liquid crystal display device according to claim 11.

17. An electronic device comprising the liquid crystal display device according to claim 11.

18. An electronic device comprising a first housing and a second housing combined with each other, wherein at least one of the first housing and the second housing comprises the liquid crystal display device according to claim 11.

19. The electronic device according to claim 18, wherein the first housing and the second housing are combined with a hinge so that the electronic device is able to be opened and closed.

20. The electronic device according to claim 18, wherein the electronic device is selected from a game machine and an electronic book reader.

21. The liquid crystal display device according to claim 11, further comprising a pair of polarization plates which sandwiches the liquid crystal panel.

* * * * *